> United States Patent Office 2,888,319
Patented May 26, 1959

2,888,319

PROCESS OF PRODUCING ALKALI METAL FLUOZIRCONATES

Gunter H. Gloss, Libertyville, Ill., assignor to International Minerals & Chemical Corporation, a corporation of New York No Drawing. Application April 18, 1955
Serial No. 502,205

9 Claims. (Cl. 23—16)

The present invention relates to a process of treating silica-zirconium ores to produce therefrom water-soluble alkali metal fluozirconates.

Heretofore, the water-soluble alkali metal fluozirconates have been prepared by forming concentrated acid fluoride solutions of zirconium and precipitating therefrom the fluoride salt by the addition of an alkali metal fluoride thereto. Such methods as this result in the formation of water-soluble fluoride salts, not only of the zirconium present in the raw material, but also the same process produces the water-soluble fluoride salts of the impurities contained in the raw material as well.

Additionally, Kawecki, U.S. Patent 2,418,074, has devised a method which is a considerable improvement over these old methods. The Kawecki process involves the reaction of zirconium ores directly with an alkali metal silicofluoride, without involving a solution in which the reaction takes place; it also involves a sintering operation at temperatures between 600° C. and 800° C., however, the yields of alkali metal fluozirconates have not been particularly high by this method, principally for the reason that the temperatures employed could not exceed 800° C., without encountering substantial fusion during the operation. Most types of practical commercial sintering devices are not designed to take care of efficiently the fusion reactions, hence a great deal of trouble was involved in maintaining the apparatus in operating condition if a fusion unavoidably took place. Higher temperatures, while improving the yields of the alkali metal fluozirconates, resulted in the effecting of substantial amounts of fusion so that, although the efficiency of the process so far as the ultimate product is concerned was much better, the overall efficiency was very low due to the tie-up of equipment for cleaning and for chipping out the fused material.

It is an object of the present invention to produce alkali metal fluozirconates from silica-containing zirconium ores under conditions of operation improving the recovery of the alkali metal fluozirconates, and while employing reaction times considerably less than those heretofore thought possible.

It is a further object of the invention to carry out a novel process of producing water-soluble alkali metal fluozirconates in conventional furnacing equipment designed for use of temperatures of the order of 800° C. or better, but without the necessity of fusing the materials while in the heating equipment.

It is still a further object of the invention to produce water-soluble alkali metal fluozirconates from silica-containing zirconium ores in improved yields based upon the zirconium employed in the reaction.

Other objects of the invention will be apparent upon a more complete understanding of the invention as hereinafter described.

Whereas, in following the Kawecki process, and using temperatures of 800° C., it is only possible to secure 65 to 70% yields of potassium fluozirconates, based upon the zirconium present in the raw material, and even using a sintering time up to as long as 90 minutes, it has now been discovered that temperatures as high as 875° C. may be employed in reaching conversions approaching 85 to 100% of the water-soluble alkali metal fluozirconates, based on the zirconium present in the raw material, if, in the sintering of potassium or sodium silicofluoride with a silica-containing zirconium ore, added amounts of silica are employed in the sintering mixture. Thus, for example, zircon in the dry state, and preferably sized so that it passes at least a 60-mesh screen, is admixed in the dry state with an alkali metal silicofluoride, such as, for example, sodium or potassium fluosilicate, in approximately equal molar amounts. Additionally, there is added to the mixture silica or a silica-containing substance; this silica-containing material may be finely-divided sand, water-insoluble, silica-containing residue produced at a subsequent stage of the process (as will be more fully hereinafter described), silica produced in admixture with potassium silicofluoride or sodium silicofluoride, or silica obtained or produced from any suitable source.

Generally speaking, the silica-containing zirconium ores, such as, for example, zircon, consist essentially of zirconium silicate ($ZrO_2 \cdot SiO_2$), that is, the zirconium ores generally contain silica present in about equal molar mixtures. A suitable zircon sand was found to analyze about 63.6% $ZrO_2$, and about 33% $SiO_2$, with the remaining portion of the composition being minor amounts of titania and ferric oxide. To this zircon sand and its mixture with an alkali metal silicofluoride, there is added between about ½ and about 2 mols excess of additional silica, over and above the equal molar quantities of silica-zirconia, for mixture so that the total silica content per mol of $ZrO_2$ is about 1½ to about 3 mols per mol of $ZrO_2$.

Expressed another way, between about 30 and about 60% by weight excess of silica is added to the zircon-alkali metal silicofluoride mixture, prior to sintering the mixture. In general, it may be stated that, while these amounts have been found entirely suitable, amounts of added silica outside of these limits are permissible; but, as a general proposition, it can be stated that, the higher the amount of added silica, the higher temperature may be used in the sintering operation, without encountering substantial fusion; and, likewise, the shorter time required for sintering, in order to effect substantially 100% production of alkali metal fluozirconate.

In general, the sintering temperatures will range from just above 800° C. up to about 875° C., or, in some instances where extremely large amounts of silica have been added, to temperatures as high as 900° C., the reaction or sintering times have been found to be between 15 and about 60 minutes, although longer or shorter periods of time can be employed. In general, with the higher temperatures, the shorter sintering times are desirable; and, with the lower temperatures, the longer sintering times are desirable. Yields of water-soluble alkali metal fluozirconates of the order of 85 to 100% are attainable by such correlation of the reaction conditions, when employing molar excesses of silica in the original sintering mixture. In the absence of such added silica, however, the charges, when subjected to sintering, became fused or too soft to be handled in conventional rotary kilns, which are direct fired, when a temperature of about 800° C. was exceeded. For this reason, it was found essential to augment the initial charge with added silica, in order to raise the fusion point of the mixture being sintered. Also, it was found that the yield was not only increased, but that there were no detrimental side effects through the addition of the silicious materials to the original mixture to be sintered.

One of the preferred forms for the addition of the silica was the leach residue produced at a subsequent stage in the process. After the mixture had been sintered at say 850° C., for 45 minutes, it was allowed to cool to somewhat below its reaction temperature, and was then leached with hot water, which was maintained at a temperature between about 45° C. and about 90° C., in order to remove the water-soluble alkali metal fluozirconates. The insoluble residue from this water-leaching operation contained large amounts of silica. Additionally, it contained some residual amounts of alkali metal fluozirconate, which was formed from the residual zirconium silicate left in the silica. In the interests of securing high yields and economy of operation, this insoluble residue left after the water leaching of the sintered product is the material preferred for addition to the original mixture prior to sintering. Its use results in improved yields of ultimate potassium or sodium fluozirconate, and, in general, it may be said that, by so employing this silica, the higher the temperature employed in the sintering operation without fusion, the better the conversion to the alkali metal fluozirconate, and the more complete the recovery of the product or coupled with a shorter reaction time. The recycle of the water-insoluble residue from the hot-water leach operation was the preferred material for the control of the fusion or softening point in the sintering operation.

One convenient method for physically presenting the original mixture for sintering is to pelletize the same. This may be done by moistening the mixture with from 5 to 10% water, and pelletizing the mixture, prior to subjecting it to the rotary kiln furnacing operation. Additionally, the final water solution of potassium or sodium fluozirconate may be recovered in solid form by evaporating the hot-water leached solution, allowing it to cool, and thus permitting crystallization of the sodium or potassium fluozirconates, which may then be filtered or centrifuged, dried, and stored for shipment. These products find uses in the light metal alloy industry, and the like. The mother liquor from the crystallization operation may be used as the moistening agent in preparing the original mixture in pellet form.

Zirconium hydroxide may be produced from the alkali metal fluozirconates by simply hydrolyzing a solution of the alkali metal fluozirconates with potassium or sodium hydroxides. Additionally, the potassium or sodium fluoride formed in this reaction may be separated as a solution, and treated with silica and sulphuric acid, to produce additional quantities of potassium or sodium fluosilicate, which may be separated from the reaction mixture, and reused in the original sintering operation.

The following examples are given by way of illustration, but it is not intended that the invention be limited thereto. The parts are stated as parts by weight.

*Example I*

About 30 parts of zircon sand, passing a 60-mesh screen, were admixed with 34.7 parts of solid potassium fluosilicate and about 15 parts of a residue obtained from the hot water leaching of the sintered mixture from a previous experiment. This material was moistened with mother liquor or water to the extent of 5 to 10%, and was pelletized. It was then introduced into a furnace and was heated to a temperature of about 860° C. for about 30 minutes. The resultant material was allowed to cool, was ground to a convenient particle size, and then leached with water maintained at a temperature between about 70° C. and about 85° C. About 39.6 parts of crystallized potassium fluozirconate was obtained by evaporation and filtration of the leach liquor. This corresponds to a zirconium recovery of about 88.5%.

*Example II*

About 30 parts of zircon sand, as was used in Example I, was admixed with about 34.7 parts of solid-phase potassium fluosilicate and about 20 grams of residue, as described in the previous example. This was moistened, as described in Example I, pelletized, and heated in a furnace at about 850° C. for about 30 minutes. The zirconium recovery in the form of potassium fluozirconate after hot water leaching and evaporation was about 86.1%.

*Example III*

About 30 parts of zircon sand was admixed with about 40 parts of potassium silicofluoride and about 30 parts of the residue from the hot water leaching operation. It was pelletized, as described in Examples I and II, and heated to a temperature of about 850° C. for about 45 minutes. The zirconium recovery after hot water leaching, evaporation crystallization, and filtration was about 92.8, and it was recovered in the form of potassium fluozirconate.

Having now thus fully described and illustrated the character of the invention, what is desired to be secured by Letters Patent is:

1. In a process for recovering zirconium values from a zirconium silicate ore wherein a mixture of said ore with an alkali-metal silicofluoride is heated to convert the zirconium therein into a water-soluble alkali-metal fluozirconate, and said alkali-metal fluozirconate is leached from the treated ore with water, the improvement which comprises admixing with said ore and said alkali-metal fluozirconate, prior to said conversion, a sufficient quantity of silica to raise the silica-to-zirconia molar ratio in the total mixture to at least about 1.5:1, and heating the resulting mixture to a sintering temperature in excess of 800° C. but below the temperature at which substantial fusion takes place, whereby the conversion and recovery of said zirconium values are substantially increased.

2. The process of claim 1 wherein said mixture is heated for a period of about 15 to about 60 minutes.

3. The process of claim 1 wherein said mixture is heated at a temperature above 800° C. and below about 875° C.

4. The process of claim 1 wherein the quantity of added silica is sufficient to raise the silica-to-zirconia molar ratio to between about 1.5:1 and about 3:1.

5. The process of claim 1 wherein the added silica is the water-insoluble residue obtained by water-leaching a previous reaction product of said process.

6. The process of claim 1 wherein said alkali-metal silicofluoride is potassium fluosilicate.

7. The process of claim 1 wherein said ore is zircon sand.

8. A process which comprises sintering zircon sand with potassium silicofluoride and between about 30 and about 60% by weight, based on the zircon sand, of the water-insoluble residue from a subsequent water leaching step, while at a temperature of above 800° C., but below 875° C., for about 30 to about 45 minutes, leaching the sintered mixture with water at a temperature between about 45 and about 90° C., separating the liquids from the solids, recovering potassium fluozirconates from the separated liquid, and recycling a portion of the solids to the sintering step.

9. A process as in claim 8, wherein the potassium fluozirconate is filtered as solution from the water-insoluble leached residue and is recovered by crystallization from the evaporated filtrate.

References Cited in the file of this patent

UNITED STATES PATENTS

| | | |
|---|---|---|
| 1,916,226 | Kinzie | July 4, 1933 |
| 2,418,073 | Kawecki | Mar. 25, 1947 |
| 2,418,074 | Kawecki | Mar. 25, 1947 |
| 2,478,912 | Garbo | Aug. 16, 1949 |
| 2,653,855 | Kawecki | Sept. 29, 1953 |